Patented Sept. 12, 1944

2,358,064

UNITED STATES PATENT OFFICE 2,358,064

METHOD OF PREPARING OXIDIZED CELLULOSE ESTERS

Charles R. Fordyce, Rochester, N. Y., assignor to Eastman Kodak Company, Rochester, N. Y., a corporation of New Jersey No Drawing. Application July 24, 1940,
Serial No. 347,198

7 Claims. (Cl. 260—230)

This invention relates to a method of preparing oxidized cellulose esters, particularly oxidized cellulose acetate, in which the oxidized cellulose ester is refined by washing with hard water and subsequently treated with boiling water free of simple calcium ions. It is preferred that the oxidized cellulose ester be prepared by means of an aqueous solution of potassium permanganate and a strong acid such as sulfuric acid.

Previously oxidized cellulose acetate has been washed with distilled water. This has been found to affect the adhesive properties of the material. If instead of distilled water, ordinary tap water is used, the resulting product exhibits insolubility in organic solvents, thus interfering with its usefulness for many purposes. In the making of oxidized cellulose acetate in which permanganate has been employed the treatment has been with an aqueous solution of the permanganate. This treatment requires the use of a high temperature and in order to accomplish the desired oxidizing within a reasonable time, this treatment is rather severe and also may cause loss of acetyl content.

An object of my invention is to provide a method of preparing oxidized cellulose esters in which the resulting product exhibits good adhesive properties and also solubility in organic solvents. Other objects of my invention will appear herein.

I have found that if an oxidized cellulose ester, such as oxidized cellulose acetate is washed preferably with at least 5 or 6 changes of water having a hardness of above 100 parts per million, or more thorough washing, such as 20 to 30 changes of water of as low as 50 parts per million hardness, followed by boiling in water substantially free of calcium ions, that a product is obtained having good adhesive properties, low viscosity and solubility in organic solvents such as acetone. I have found that by refining the oxidized cellulose ester in this manner, a product is obtained having utility in lacquers or in the making of laminated glass. Also, the material prepared is useful as an adhesive to unite a photographic emulsion to its support. I have found that if the oxidized cellulose ester is prepared using an alkali metal permanganate with any of the following acids, sulfuric, phosphoric, hydrochloric, toluene-sulfonic, mono-, di- or tri- chloro acetic acids, that the adhesive properties are still further improved, the material exhibits even better flexibility and the time of oxidizing the cellulose ester may be considerably shortened without any tendency towards causing an alteration of the chemical or physical properties of the cellulose ester outside of the effect of the oxidizing treatment itself.

The cellulose esters which may be treated by my process are any of the lower fatty acid esters of cellulose containing unesterified hydroxyl groups of which acetone soluble cellulose acetate is typical. Other esters of this class, such as partially hydrolyzed cellulose acetate propionate, partially hydrolyzed cellulose acetate butyrate or the partially hydrolyzed simple cellulose esters of the saturated fatty acids of 2-4 carbon atoms, are suitable for use as the starting material in my process.

The water which is used to treat the oxidized cellulose ester at its boiling point, after the preliminary treatment with hard water, may be either distilled water, ordinary water in which the calcium has been converted to a complex ion, such as by treatment with sodium meta phosphate, sometimes referred to as "Calgon," or water, which has been softened, such as with a Zeolite or base-exchange softening material or a "Zeo-Karb" softening process in which the salts are converted to acids and the acid radical is absorbed. It is desirable in refining the oxidized cellulose ester that a small amount of bleaching agent such as sulfur dioxide or oxalic acid be used to remove the manganese dioxide from the product. If, however, this discoloration is not objectionable, such as where use in dark-colored lacquers is contemplated, the treatment with the sulfur dioxide may be dispensed with. The oxidation of the cellulose ester may be carried out in either distilled or in tap water having the hardness prescribed above. It is preferred then to pass sulfur dioxide gas into the reaction mass to completely remove the color which is present. If desired, however, the product may first be removed from the reaction mixture and then suspended in water containing sulfur dioxide to remove the coloration. After the treatment with bleaching agent the product is thoroughly washed with water having the prescribed hardness to remove the sulfur dioxide and the coloring material which was dissolved thereby. The product is then treated with water substantially free of simple calcium ions near the boiling temperature, or at least 80° C. Obviously, if desired, the material may be put in an autoclave and subjected to a treatment at an elevated temperature, such as up to 150 or 160° C. or more. Merely treating at or near the boiling temperature under ordinary atmospheric pressure is usually sufficient to render the product homogeneous and nicely soluble in acetone or other organic solvents.

If desired, the refining treatment, described herein, may be employed upon a cellulose ester oxidized with potassium permanganate or some other oxidizing agent whether or not one of the acids listed is present. I have found, however, by using one of the acids listed with permanganate a better product is obtained than in the ordinary type of oxidation treatment. If the adhesive properties are not important, the cellulose ester oxidized with permanganate and one of the acids listed may be refined merely by using distilled water in all of the washing treatments. Also, if the solubility in organic solvents is not of importance, washing with tap water may be satisfactory. However, I prefer to use the combination of oxidizing with permanganate and one of the acids listed and refining by washing with hard water and then boiling in water free of simple calcium ions to obtain a product which has both superior adhesive properties and good solubility in acetone and which also has superior coating properties, although either of the two subcombinations themselves are useful in preparing oxidized cellulose esters. If desired, the oxidized cellulose ester may be subjected to two or even three boiling treatments with distilled water or water containing no simple calcium ions to assure accomplishment of the purpose of this treatment. The amount of water which is employed is, of course, optional. However, a good operator will use a substantial excess of water, both in the washing and boiling treatments, to effectively remove impurities. If the amount of water used is restricted the removal of impurities will ordinarily not be as effective, thus necessitating more boiling steps.

The following examples illustrate my invention:

Example I 100 parts of cellulose acetate, having an acetyl content of 40.5%, was suspended in 1600 parts of ordinary tap water containing 10 parts of potassium permanganate and 15 parts of sulfuric acid. The mixture was stirred at 25° C. until the permanganate color had completely disappeared. Sulfur dioxide gas was introduced into the brown colored suspension in order to completely remove the color. The product was then thoroughly washed with tap water. A sample of this product when dried was found to be insoluble in acetone, giving only a gelatinous mass. The product was divided into two parts, the first part being suspended in 20 parts of boiling tap water containing sufficient Calgon to eliminate the simple calcium ions present. In this case .02 part of Calgon was used. The product was then centrifuged from the water in which it had been boiled and was dried. The second portion of the oxidized cellulose acetate was suspended in 20 parts of boiling distilled water for two hours and was then centrifuged and dried. The dried products from both of the portions after the boiling were readily soluble in acetone and gave solutions of low viscosity. Films coated from these solutions onto both glass and metal surfaces exhibited extremely strong adhesion even with film thickness as high as .005". Most lacquer compositions when coated onto surfaces so as to form a thickness of .005" are quite readily removed from the support. This was not the case here as a film of the oxidized cellulose acetate having this thickness adhered tenaciously to a surface. The product obtained also exhibited good stability both as to discoloration at elevated temperature and degradation upon ageing.

Example II 100 parts of cellulose acetate, having a acetyl content of 38%, was suspended in a solution of 10 parts of potassium permanganate and 13.5 parts of sulfuric acid in 1500 parts of distilled water. The mass was held at 25° C. until the permanganate color had entirely disappeared, which in this case required three hours. The suspended acetate was then treated with tap water containing sulfur dioxide to remove the manganese dioxide. The product was then treated with boiling distilled water and dried. A product, having good adhesive properties and good stability, was obtained.

Example III

A procedure like that of the preceding example was carried out by using instead of cellulose acetate, a partially hydrolyzed cellulose acetate propionate having a propionyl content of 33% and an acetyl content of 12%. Two hours were required for the oxidation. A product having good adhesive properties was obtained.

Example IV 100 parts of cellulose acetate, having an acetyl content of 33%, was suspended in a solution of 10 parts of potassium permanganate and 13.5 parts of sulfuric acid in 1400 parts of distilled water. The mass was maintained at 25° C. for 3½ hours, the color of the permanganate being entirely gone at the end of that time. The oxidized cellulose acetate was treated with ordinary water containing sulfur dioxide to remove the discoloration. The product was then treated with boiling distilled water and dried. The product was found to be soluble in aqueous acetone containing very high concentrations of water.

Example V 100 parts of a partially hydrolyzed cellulose acetate was suspended in 1800 parts of water containing 10 parts of potassium permanganate and 75 parts of monochloracetic acid. The mass was maintained at approximately 25° C. until the permanganate color completely disappeared, which required approximately 27 hours.

The manganese dioxide was removed from the cellulose acetate after separating it from the reaction mixture by bleaching with water containing sulfur dioxide. The product was washed and then boiled in distilled water as described in Example I.

Example VI

The procedure of the preceding example was repeated except that 130 parts of trichloracetic acid was used instead of the monochloracetic acid. Approximately 30 hours was required for the permanganate color to disappear.

Example VII

The procedure of Example V was repeated using 200 parts of toluene sulfonic acid instead of the monochloracetic acid. The color of the permanganate was gone in 24 hours.

Example VIII

The procedure of Example V was repeated using 80 parts of hydrochloric acid (35% HCl) for the acid component. The disappearance of the permanganate color occurred in approximately 31 hours.

The material produced in accordance with my invention, due to its good adhesive properties, may be employed in making laminated glass by coating it out onto the surface of the glass from a volatile solvent, such as acetone or the like. If desired, the oxidized cellulose ester made in accordance with the described process may be incorporated in lacquers, such as mixed with cellulose acetate and a plasticizer. Due to the excellent adhesive properties of the oxidized cellulose acetate, lacquer coatings, made therefrom, adhere tenaciously to surfaces to which they are applied.

It is most desirable in carrying out the oxidation of cellulose esters in accordance with my invention that no excess of permanganate be used or, in other words, that it be entirely consumed in the oxidizing. If, however, economy is no object, an excess of permanganate can obviously be employed which is washed out of the ester in subsequent washing treatments. When only the amount of permanganate necessary is used, the termination of the oxidation is indicated by the disappearance of the purple color of the permanganate.

When an excess of permanganate is used, the time of treatment to obtain the necessary oxidation depends upon the rate at which the cellulose ester is oxidized. This in turn depends upon the amount and strength of acid employed and the temperature of the mass. In the oxidation of the cellulose ester an amount of acid at least equal to the weight of the permanganate should be used. In the case of sulfuric acid, the proportion employed is usually within the range of one to three parts of sulfuric acid per part of permanganate. With acids other than sulfuric acid, the amount used should be that which will give the same acid strength as one to three parts of sulfuric acid. If with sulfuric acid the amount of acid catalyst is increased much beyond the range given, satisfactory control of the oxidizing operation is difficult due to the increase in rate of oxidation. Also, this might cause the generation of an excess amount of heat which, with the high proportion of sulfuric acid employed, might cause degradation of the cellulose. Therefore, for the most satisfactory operations, the amount of acid catalyst should not be too high. If it is desired to skimp on the amount of acid catalyst used, this might be recompensed for to some extent by some elevation of the temperature, all these variations being within the judgment of the individual operator. It is preferred, however, to operate near room temperature and within a range of one to three parts of sulfuric acid per part of permanganate or a corresponding strength of acid to the other acids which have been indicated as useful.

I claim:

1. A method of preparing an oxidized cellulose ester which comprises oxidizing a partially hydrolyzed lower fatty acid ester of cellulose with a dilute aqueous solution of a water soluble permanganate and approximately 1–3 parts of sulphuric acid per part of permanganate for a sufficient time to give a product which, after thorough washing in hard water, is insoluble in acetone, and subsequently thoroughly washing the product with hard water followed by washing it with hot water substantially free of calcium ions ($Ca^{++}$) to obtain a product having good adhesive properties and acetone solubility.

2. A method of preparing an oxidized cellulose ester which comprises oxidizing a partially hydrolyzed cellulose acetate with a dilute solution of an alkali metal permanganate and approximately 1–3 parts of sulphuric acid per part of permanganate for a sufficient time to give a product which, after thorough washing in hard water is insoluble in acetone, and subsequently thoroughly washing the product with hard water, followed by washing it with hot water substantially free of calcium ions ($Ca^{++}$) to obtain a product having good adhesive properties and acetone solubility.

3. A method of preparing an oxidized cellulose ester which comprises oxidizing a partially hydrolyzed lower fatty acid ester of cellulose with a dilute aqueous solution of an alkali metal permanganate and approximately 1–3 parts of sulphuric acid per part of permanganate for a sufficient time to give a product which, after thorough washing in hard water is insoluble in acetone, treating the oxidized cellulose acetate with sulphur dioxide, and subsequently thoroughly washing the product with hard water, followed by washing it with hot water substantially free of calcium ions ($Ca^{++}$) to obtain a product having good adhesive properties and acetone solubility.

4. A method of preparing an oxidized cellulose ester which comprises oxidizing a partially hydrolyzed cellulose acetate with a dilute solution of an alkali metal permanganate and approximately 1–3 parts of sulphuric acid per part of permanganate for a sufficient time to give a product which, after thorough washing in hard water is insoluble in acetone, treating the oxidized cellulose acetate with sulphur dioxide, and subsequently thoroughly washing the product with hard water, followed by washing it with hot water substantially free of calcium ions ($Ca^{++}$) to obtain a product having good adhesive properties and acetone solubility.

5. In a process of preparing an oxidized cellulose ester, the step which comprises oxidizing a partially hydrolyzed cellulose ester of fatty acids of 2–4 carbon atoms with a dilute aqueous solution of an alkali metal permanganate and 1–3 parts of sulphuric acid per part of permanganate for a sufficient time to give a product which is insoluble in acetone after thoroughly washing in hard water.

6. In a process of preparing an oxidized cellulose ester, the step which comprises oxidizing partially hydrolyzed cellulose acetate with a dilute aqueous solution of an alkali metal permanganate and 1 to 3 parts of sulphuric acid per part of permanganate for a sufficient time to give a product which is insoluble in acetone after thoroughly washing in hard water.

7. In a process of preparing an oxidized cellulose ester, the step which comprises oxidizing a partially hydrolyzed cellulose acetate having an acetyl content of approximately 40 per cent with a dilute aqueous solution of an alkali metal permanganate and 1 to 3 parts of sulphuric acid per part of permanganate for a sufficient time to give a product which is insoluble in acetone after thoroughly washing in hard water.

CHARLES R. FORDYCE.